United States Patent Office 3,333,419
Patented Aug. 1, 1967

3,333,419
HYDROGEN PEROXIDE DECOMPOSITION
Herman J. Baumgartner, Danville, and George C. Hood, Orinda, Calif., and Donald D. Weaver, Houston, Tex., assignors to Shell Oil Company, New York, N.Y., a corporation of Delaware
No Drawing. Filed Aug. 8, 1963, Ser. No. 300,919
8 Claims. (Cl. 60—218)

This invention relates to the catalytic decomposition of hydrogen peroxide with silver catalysts to produce steam and oxygen. It deals with an improvement in the known methods of carrying out this decomposition whereby more efficient and advantageous operation of the catalyst units can be obtained.

Decomposition of hydrogen peroxide to steam and oxygen is being used increasingly in jet propulsion and other applications where there is need for rapid generation of energy. The peroxide is usually decomposed in a packed bed of solid decomposition catalyst. Silver or silver alloys are generally preferred for this purpose because they can give desirable high decomposition rates. In certain applications, especially in reaction motors, control devices for rockets, and the like, it is essential to provide reliable, rapid starting characteristics. This requires a high specific decomposition rate for the hydrogen peroxide. It has not been possible in the past to provide the most desirable high $H_2O_2$ decomposition rates without simultaneous high loss of catalyst from the bed. This high rate of catalyst loss from the bed results in either short catalyst bed life or high pressure drop buildup in the bed which prevents proper operation of the motor or control device. This loss of catalyst is particularly undesirable where repeated motor operation is required. This is the situation, for example, in control devices for rockets used intermittently to maintain the rocket on course, or for other purposes. Repeated starts from ambient or lower temperature are necessary in such cases, and it is essential that the catalyst loss be held at a minimum so that a long, effective life is obtained with the smallest possible amount of catalyst.

A method has now been discovered for modifying hydrogen peroxide to improve the effective life of the silver decomposition catalysts and at the same time improve the decomposition rate on the catalyst. This new method requires the addition to the hydrogen peroxide of one or more members of a remarkably effective new class of activators which has been discovered for addition to the hydrogen peroxide which is to be decomposed. These additives improve decomposition on fixed bed catalysts and reduce loss of silver catalyst in repeated operation at ambient or lower start-up temperatures. This improvement was not foreseeable. Indeed, it would have generally been predicted that additives for increasing the specific decomposition rate of hydrogen peroxide on solid silver catalysts would be undesirable in the peroxide since they would be expected to make the hydrogen peroxide more unstable during storage prior to use. The new additives used in the decomposition method of the invention do not have this disadvantage but are selective in their action. They promote the catalytic decomposition of the peroxide by solid silver catalysts for peroxide decomposition but do not increase the rate of hydrogen peroxide decomposition in the absence of such silver catalysts. Actually, it has been found that there is no correlation between the effect of additives on the stability of hydrogen peroxide in the absence of decomposition catalysts such as silver and their effect on the decomposition rate as catalyzed by these catalysts. The activators used in the process of the invention even improve the storage stability of the hydrogen peroxide in some circumstances, and for this reason, also would not be expected to increase its rate of catalytic decomposition by the silver catalysts used in rocket motors.

The new method of hydrogen peroxide decomposition according to the invention comprises contacting the hydrogen peroxide with a silver-containing catalyst for peroxide decomposition while having dissolved in the hydrogen peroxide an inorganic salt of metal of invariant valence which is a member of the right-hand group of the third column of the Periodic Table of the Elements and has an atomic number of at least 30.

Inorganic salts of zinc and cadmium which are soluble in hydrogen peroxide of 30% or higher concentration, in an amount which will provide the equivalent of at least 0.1 milligram of zinc and/or cadmium per liter of solution, should be used. In order to avoid poisoning of the silver catalyst surface, it is desirable to use salts which do not introduce into the hydrogen peroxide anions which form silver salts having a solubility less than 3 milligrams in 100 grams of water at 20° C. Most advantageously, zinc or cadmium salts of inorganic anions which do not have an adverse effect upon the stability of hydrogen peroxide in storage are employed in the process. In choosing the form of the salt to be added as decomposiiton activator, consideration should, of course, be given to the general specifications which have been set for hydrogen peroxide intended for decomposition using silver catalysts. The military specification for hydrogen peroxide for use in reaction motors (MIL–H–16005C as modified by Supplemental Data Sheet of Apr. 10, 1962) sets these limits for components of the peroxide:

| | Mg./l. |
|---|---|
| $PO_4$ | 0.5 max. |
| Al | 0.6 max. |
| $NO_3$ | 3.0 min.→5.0 max. |
| $SO_4$ | 3.0 max. |
| $NH_4$ | 2.6 max. |
| Sn | 4.0 max. |
| Cl | 1.0 max. |
| C | 200.0 max. |

It is on this account that phosphates, including pyrophosphates and halides, other than the fluorides, are not desirable as anions for the promoters of the invention since these are particularly active poisons for silver decomposition catalysts. Preferred zinc and/or cadmium inorganic salts are the sulfate, stannate, nitrate, carbonate, silicate, borate, nitrite, and the like. Acid or basic salts can be used instead of the neutral salts, for example, zinc or cadmium bicarbonate, or bisulfate.

The inorganic zinc and cadmium salts are advantageously used in amounts which introduce into the peroxide about 0.1 to about 10 milligrams of total zinc and/or cadmium per liter of the hydrogen peroxide, most advantageously amounts equivalent to about 0.5 to about 3 milligrams of these metals per liter are used.

The hydrogen peroxide can contain other components which do not interfere with the desired catalytic decomposition. These include stabilizers for the hydrogen peroxide, many of which are in use. Preferably sodium stannate or the like is used as stabilizer, and improved stabilization as well as improved catalytic decomposition of the hydrogen peroxide can be obtained by using as the activator according to the invention, zinc and/or cadmium stannate. Good results can also be obtained, however, by using other zinc and/or cadmium salts in combination with sodium stannate or like stabilizer.

There are special advantages in using the zinc and/or cadmium salts chosen as additives for the hydrogen peroxide in combination with certain special other additives which also have a beneficial effect upon the catalytic decomposition of the peroxide by silver or like catalysts. Particularly desirable among these other additives are the salts of nickel or of the rare earth metals, having atomic numbers 57 through 71, for example, lanthanum, cerium, samarim, europium, gadolinium, neodymium, dysprosium, erbium, ytterbium, lutetium, and the like, for instance, yttrium. These can be used as the sole decomposition promoting additive in place of the zinc and/or cadmium salts preferably in an amount corresponding to the addition of about 0.2 to about 10, preferably about 0.5 to about 3 milligrams of nickel per liter of hydrogen peroxide solution. But more advantageously, the nickel, yttrium, or rare earth salt is used together with one or more zinc and/or cadmium salts because it has been found that in these combinations these salts markedly improve the hydrogen peroxide decomposition. Remarkable synergistic effects in improving the catalytic decomposition can be obtained with combinations of these salts which produce results that are better than the sum of those obtained when these additives are used individually. The nickel, yttrium, or rare earth salt may be that of any of the previously described useful anions; and its anion may be the same or different from that of the zinc and/or cadmium salt with which it is employed. It is advantageously used in an amount such that the total amount of zinc, cadmium and nickel, or other indicated metal used is in the range previously indicated as desirable for zinc and/or cadmium.

The hydrogen peroxide decomposed preferably has a concentration of at least 30% by weight and more advantageously is concentrated hydrogen peroxide of 80% wt. strength or higher, most preferably about 90 to 100% wt. concentration.

The metallic silver-containing catalysts used in the process of the invention include pure or substantially pure silver catalysts and alloys or mixtures of metallic silver with other metals which may or may not be themselves catalysts for hydrogen peroxide decomposition. Alloys of silver with a minor amount of other catalytic metal are particularly useful. Among the other catalytic metals which can be used with silver catalysts are, for instance, precious metals such as, platinum, palladium, rhodium, iridium, osmium, and the like.

The silver catalyst or silver catalyst-containing mixture used for hydrogen peroxide decomposition according to the invention can be employed in any of the customary forms. They can, for example, be used in the forms of screens, perforated plates, or the like, which can be superimposed on each other to make a fixed bed through which the hydrogen peroxide can be passed without excessive pressure drop. U.S. Patent 2,865,721, for example, described suitable catalyst bed assemblies containing silver catalysts which can be used in the process of the present invention. Beds of granular or other porous forms of silver-containing decomposition catalyst can also be used.

While it is a special advantage of the process of the invention that the decomposition of the hydrogen peroxide can be initiated at low, initial temperatures, this is not essential for successful operation which can be carried out with hydrogen peroxide at any temperature and pressure at which the peroxide feed is in the liquid state. Feed temperatures of the order of about $-20°$ to about $60°$ C. and operating pressures of atmospheric to about 100 atmospheres are generally suitable, but other operating conditions can also be used.

The source of the hydrogen peroxide which is decomposed is not important in the new process, which can be carried out successfully with hydrogen peroxide from any source. The new method has been used with hydrogen peroxide of different kinds and can be advantageously employed with hydrogen peroxide from organic sources, such, for instance, as the oxidation of alkyl anthraquinones, or alcohols, or hydrocarbons, or hydrazobenzenes, for example, as well as with electrolytic hydrogen peroxide.

The following examples illustrate in more detail suitable methods for carrying out the new process and show some of its advantages. In these examples, the decomposition efficiencies in the various tests are reported as the number of gram moles of hydrogen peroxide which were decomposed per gram of catalyst metal lost at a standard catalyst area and length of time of operation. This is the single most significant parameter with respect to performance in practical motors, and a high efficiency of this kind characterizes the most desirable hydrogen peroxide feed for the motor. A high, specific hydrogen peroxide decomposition rate is also advantageous as previously pointed out since it provides improved starting at low temperatures and results in reduction of the time required for starting a decomposer at a given temperature.

EXAMPLE I

Dynamic tests were carried out which determined the rates of hydrogen peroxide decomposition and of loss of catalyst at the inlet of a hydrogen peroxide decomposer using a silver catalyst. The liquid 90% wt. hydrogen peroxide feed was pressured from a 347 stainless-steel tank with nitrogen through an automatic valve controlled by a Pedersen automatic feed rate balance using a flow rate of 45 grams of the hydrogen peroxide solution per minute. The feed hydrogen peroxide was heated to reaction temperature in a section of ⅛-inch stainless-steel tubing immersed in a water bath. After contacting the catalyst in the form of a pure silver rod ¼-inch long and ⅛-inch in diameter into which a thermocouple was silver soldered, the effluent was passed through a cooler, back pressure regulator and gas-liquid separator. The average of the temperatures of the hydrogen peroxide stream measured with thermocouples just before and after the silver catalyst was $25°$ C. during the test which was carried out at 300 p.s.i.a. The loss of catalyst was determined by accurate weighing of the silver specimen before and after the test which was carried on for 30 minutes. With hydrogen peroxide produced via oxidation of secondary alcohol and analyzing less than 0.05 milligram each of tin and phosphorous (from sodium stannate and sodium pyrophosphate stabilizers) and 0.20 milligram of aluminum and 0.04 milligram of chloride per liter of peroxide solution which had a pH of 0.7 direct meter reading, the following results were obtained.

| Additive (in solution in the hydrogen peroxide) | Amount (milligrams of indicated component per liter of $H_2O_2$ solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | 0.133 | 530 |
| $Zn(NO_3)_2 \cdot 6H_2O$ | 0.7 Zn | 0.181 | 1,700 |
| $Zn(NO_3)_2 \cdot 6H_2O$ | 1.4 Zn | 0.205 | 3,160 |
| $Cd(NO_3)_2 \cdot 4H_2O$ | 1.4 Cd | 0.197 | 1,400 |

Good results are also obtained when equivalent amounts of zinc or cadmium are dissolved in the hydrogen peroxide in the form of the sulfate or bicarbonate. When electrolytically produced, hydrogen peroxide of the same concentration which analyzed 0.70 mg. tin, 0.02 mg. phosphorus, and 0.16 mg. aluminum per liter and had a pH of 0.6 was used in the same way with zinc nitrate added in the amount equivalent to 1.0 mg. Zn per liter, the decomposition rate was 0.197; and the decomposition efficiency was 1940.

These results are in contrast with those obtained when berryllium or magnesium salts are used in place of the zinc and cadmium. The salts of these other Group II metals give essentially no improvement in the silver catalyzed decomposition. With $Mg(NO_4)_2 \cdot 6H_2O$, for example, in an amount equivalent to 1.4 milligrams of magnesium per liter of hydrogen peroxide, the decomposition rate, when using the same hydrogen peroxide as that employed for the tests of the foregoing table, was 0.090 mole per sq. cm. of catalyst surface, minute; and the decomposition efficiency was 535 moles of $H_2O_2$ per gram of silver lost.

EXAMPLE II

A test made as described in Example I using another sample of hydrogen peroxide of 90% concentration gave the following results:

| Additive dissolved in the $H_2O_2$ | Amount of additive equivalent amount of indicated metal per liter of solution | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | 0.063 | 604 |
| $ZnF_2$ | 1.0 Zn | 0.161 | 957 |

This improvement was not obtained when the same hydrogen peroxide was used with beryllium nitrate as the additive. Amounts corresponding to 0.2 and 1.0 milligram of beryllium per liter of solution decreased the decomposition efficiency to 370 and 379, respectively.

EXAMPLE III

Tests carried out in the same way as the foregoing examples with hydrogen peroxide of 90% concentration, which, without additives, showed a decomposition rate of 0.120 mole of $H_2O_2$ decomposed per sq. cm. of silver catalyst surface, minute, and a decomposition efficiency of 407 moles of $H_2O_2$ decomposed per gram of silver lost from the catalyst, gave the following results with and without the hydrogen peroxide stabilizer, ethylenediamine tetraacetic acid disodium salt, present in addition to the zinc nitrate decomposition promoter.

| Amount of zinc nitrate additive in solution (milligrams of metal per liter) | Amount of stabilizer (EDTA salt milligrams per liter of $H_2O_2$ solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| 1.0 mg. Zn | None | .200 | 2,670 |
| 1.0 mg. Zn | 2.0 | .227 | 2,480 |

EXAMPLE IV

The effect obtained by using zinc or cadmium salts in combination or with nickel salts is shown by the following results obtained in tests carried out using the method of Example I but with hydrogen peroxide of 90% wt. concentration which was purposely contaminated with anions which adversely affected its decomposition, the $PO_4$ content being 0.25 mg. per liter and aluminum, 0.11 mg. per liter.

EXAMPLE V

Tests were made in a Naval Air Rocket Test Station ⅝-inch diameter hydrogen peroxide decomposition evaluator (a scaled-down rocket motor) having a bed of silver screens as the catalyst. Hydrogen peroxide which had a concentration of 90% wt. was used with zinc nitrate added in an amount equivalent to 1 mg. of zinc per liter. The catalyst bed loading was 18 pounds of hydrogen peroxide solution per square inch, minute, and the chamber pressure was 300 pounds per square inch. The engine was run for 15-minute intervals, then restarted with the engine cold. Excellent performance was obtained during 8½ hours of actual running time with the hydrogen peroxide containing the zinc nitrate, and all 34 starts were good. No chugging or passage of undecomposed hydrogen peroxide was observed. The maximum pressure drop for the whole period was only 150 p.s.i., and examination of the silver catalyst screens at the end of the run showed them to be in excellent condition with no heavy deposits and silver still on all the screens.

In the run without the zinc nitrate additive, under the same conditions, good performance was obtained for only 72 minutes with six starts after which passage of undecomposed hydrogen peroxide was observed.

We claim as our invention:

1. In a method of decomposing hydrogen peroxide of at least 30% wt. concentration by contacting the peroxide with a silver-containing catalyst for hydrogen peroxide decomposition, the improvement which comprises effecting said contact with hydrogen peroxide containing dissolved therein an inorganic salt of a fixed-valent metal of the right hand group of the third column of the Periodic Table of the Elements having an atomic number of at least 30, in an amount equivalent to at least 0.1 milligram of said metal per liter of peroxide.

2. A method in accordance with claim 1 wherein the hydrogen peroxide also contains about 0.1 to about 10 milligrams of at least one rare earth metal per liter of solution.

3. In a method of decomposing hydrogen peroxide of at least 30% wt. concentration by contact with a solid silver-containing catalyst, the improvement which comprises contacting the silver catalyst with hydrogen peroxide containing a soluble inorganic salt of zinc whose anion does not form a silver salt having a solubility in water at 20° C. which is less than 3 milligrams in 100 grams of water, said zinc salt being present in an amount equivalent to between 0.2 and 3 milligrams of dissolved zinc per liter of peroxide solution.

4. A method in accordance with claim 3 wherein the hydrogen peroxide contacted with the silver catalyst also contains about 0.1 to about 3 milligrams of tin per liter.

5. In a method of decomposing hydrogen peroxide of about 85% to 100% concentration by passage through

| Additive (in solution in the hydrogen peroxide) | Amount (milligrams of indicated component per liter of $H_2O_2$ solution) | $H_2O_2$ decomposition rate (moles $H_2O_2$ decomposed per sq. cm. catalyst surface, minute) | Decomposition efficiency (moles of $H_2O_2$ decomposed per gram of silver lost) |
|---|---|---|---|
| None | None | 0.093 | 264 |
| Nickel nitrate | 1.5 | 0.208 | 830 |
| Cadmium nitrate | 0.5 | 0.207 | 870 |
| Zinc nitrate | 1.0 | | |
| Nickel nitrate | 0.5 | 0.228 | 1,900 |
| Zinc nitrate | 1.0 | | |
| Lanthium nitrate | 0.5 | 0.214 | 2,660 |
| Zinc nitrate | 1.0 | | |
| Samarium nitrate | 0.5 | 0.190 | 1,200 |
| Zinc nitrate | 1.0 | | |
| Europium nitrate | 0.5 | 0.190 | 1,470 |
| Zinc nitrate | 1.0 | | |
| Erbium nitrate | 0.5 | 0.216 | 1,775 |
| Zinc nitrate | 1.0 | | |
| Yttrium nitrate | 0.5 | 0.183 | 1,560 |
| Zinc nitrate | 1.0 | | | a bed of solid silver catalyst, the improvement which comprises feeding to said bed hydrogen peroxide containing zinc nitrate in an amount equivalent to about 0.2 to 10 milligrams of zinc per liter of peroxide.

6. In a method of decomposing hydrogen peroxide of at least 30% wt. concentration by contact with a solid silver-containing catalyst, the improvement which comprises contacting with the silver catalyst hydrogen peroxide containing a synergistic mixture of soluble inorganic salts of zinc and nickel whose anions do not form silver salts which have a solubility at 20° C. which is less than 3 milligrams in 100 grams of water, said zinc and nickel salts being present in amounts such that there is between about 0.2 and about 5 milligrams of each of said metals in dissolved form in the hydrogen peroxide.

7. In a method of decomposing hydrogen peroxide of at least 30% wt. concentration by contact with a solid silver-containing catalyst, the improvement which comprises contacting with the silver catalyst with hydrogen peroxide containing a soluble inorganic salt of cadmium in an amount equivalent to at least 0.5 milligram of dissolved cadmium per liter of peroxide solution.

8. A method in accordance with claim 7 wherein the cadmium salt is cadmium nitrate.

References Cited

UNITED STATES PATENTS

| | | | |
|---|---|---|---|
| 3,019,197 | 1/1962 | Saunders | 60—35.4 X |
| 3,142,151 | 7/1964 | Roberts et al. | 60—35.4 |
| 3,156,089 | 11/1964 | Baumgartner et al. | 60—35.4 |
| 3,212,255 | 10/1965 | Putt et al. | 60—35.4 |

CARL D. QUARFORTH, *Primary Examiner.*

BENJAMIN R. PADGETT, *Examiner.*

L. A. SEBASTIAN, *Assistant Examiner.*